Aug. 6, 1929.  C. BROWN  1,723,403
SPRAYER
Filed March 30, 1928
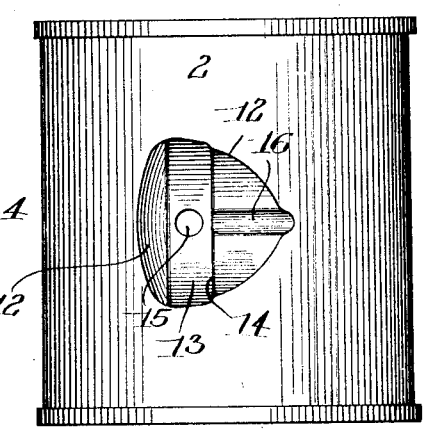
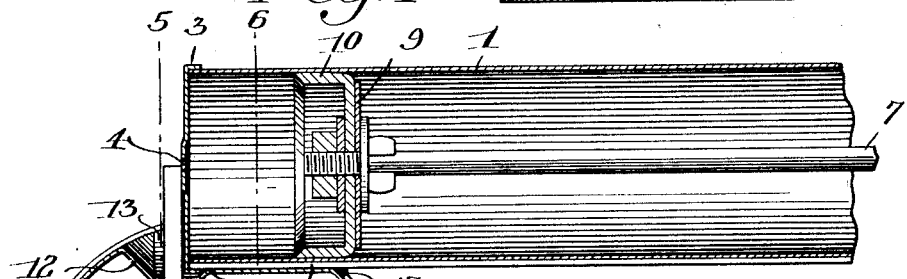
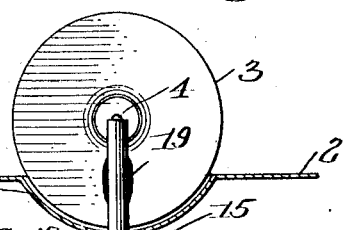
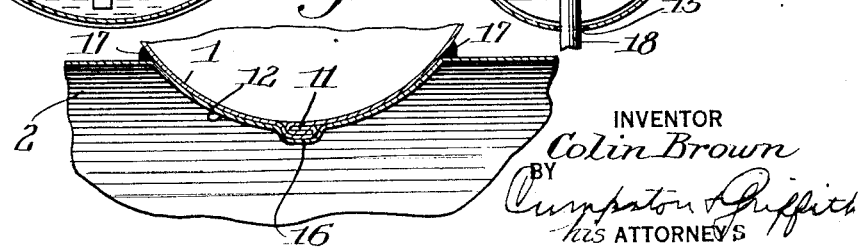
INVENTOR
Colin Brown
BY
his ATTORNEYS Patented Aug. 6, 1929.

1,723,403

UNITED STATES PATENT OFFICE.

COLIN BROWN, OF ROCHESTER, NEW YORK, ASSIGNOR TO THE E. C. BROWN COMPANY, OF ROCHESTER, NEW YORK, A CORPORATION OF NEW YORK.

SPRAYER.

Application filed March 30, 1928. Serial No. 266,069.

My present invention relates to spraying and atomizing devices and it has for its object to provide a simple, inexpensive and efficient hand sprayer of the type used for spraying plants and killing flies, and other vermin through the application of a liquid solution. The improvements are directed in part toward the mode of attaching the air compression means to the liquid reservoir, and toward the provision of a drip pan for returning to the reservoir excess liquid delivered at the point of projection of the spray.

To these and other ends the invention resides in certain improvements and combinations of parts, all as will be hereinafter more fully explained, the novel features being pointed out in the claims at the end of the specification.

In the drawings:

Figure 1 is a side elevation of a hand sprayer constructed in accordance with and illustrating one embodiment of my invention;

Figure 2 is a fragmentary top plan view thereof;

Figure 3 is an enlarged top plan view of the liquid receptacle or reservoir detached;

Figure 4 is an enlarged central longitudinal section through the reservoir and the adjacent portions of the pump clyinder taken on the line 4—4 of Figure 2;

Figure 5 is a fragmentary section through the top of the reservoir, taken on the line 5—5 of Figure 4; and Figure 6 is an enlarged fragmentary section taken on the line 6—6 of Figure 4.

Similar reference numerals throughout the several views indicate the same parts.

In the preferred embodiment of the invention as shown in the drawings, I construct the sprayer with two main elements consisting of the pump cylinder 1, and a cylindrical reservoir or liquid container 2 with reference to which the pump cylinder is, in general, tangentially disposed. Both elements are preferably composed of thin sheet metal.

The pump cylinder 1 is merely the containing part of an air compressor, or ordinary hand pump. It has a cap 3 soldered or otherwise secured to its outer end, and provided with a central air discharge orifice 4. At its inner end it is provided with a head 5 through which reciprocates in a suitable packing 6 a plunger or piston rod 7, having a projecting handle 8. At the inner end of the piston rod is a piston indicated generally at 9, and embodying the usual compression cup 10.

The cylinder 1 is formed in the usual manner of constructing such sheet metal tubing, and embodies on its under side, an interlocking or lap seam 11, that constitutes a longitudinally extending projecting rib.

The reservoir 2 is formed with a depression or indentation 12 in the top of its cylindrical wall. This indentation comprises a central depressed portion 13 forming a shoulder 14, and having in its center an opening 15. Adjoining this depression 13 at right angles thereto and in alignment with the opening 15, is a depressed channel 16.

In assembling the device the end of the compressor, or pump cylinder 1 is seated generally in the depression 12 of the reservoir. The edge of its cap 3 abuts the shoulder 14 to position it in a certain way with reference to the opening 15. Its rib or seam 11 lies in the groove or channel 16, all of which contact establishes a definite relationship between the pump and reservoir, and these two parts are preferably secured together by soldering, as indicated at 17, in Figures 1 and 6.

The syphon or atomizing tube 18 is soldered at 19 to the cylinder cap 3 with its upper end in proper atomizing relationship to the orifice 4. It extends downwardly through the opening 15, and its lower end is submerged within the body of liquid A contained within the reservoir 2. The tube does not completely fill the opening 15 for the following reasons:

During the use of the apparatus, and particularly when the pumping action is suddenly discontinued, liquid emerging from the upper end of the tube 18 remains unconverted into spray. It trickles down the tube and is caught in the depression 12, which thus forms a drip pan or pocket. From thence it travels down around the tube 18 through the enlarged opening 15, and returns to the main body of liquid A.

A sprayer of the nature described is strong and durable, and can be manufactured at a low cost, it being possible to bump out on a press the depression 12 with a single operation, and thus provide not only a secure seat for the attachment of the pump cylinder, but a drip pocket for the return of the excess liquid.

I claim as my invention:

1. In a spraying device, the combination with a cylindrical reservoir for liquid having a tangential depression bumped therein and provided with a channel, of a pump tube attached to the reservoir and having a longitudinal projecting seam seated in the channel, said pump tube being provided with an air discharge orifice, and an atomizing tube extending from said orifice into the reservoir.

2. In a spraying device, the combination with a cylindrical reservoir for liquid having a depression therein provided with an opening forming a drain, and further provided with a shoulder and with a channel at right angles to said shoulder, of a pump tube having a cap at its outer end provided with an air discharge orifice and with a portion abutting the shoulder in the depression, said pump tube being secured to the reservoir within the depression with its rib lying in the channel thereof, and an atomizing tube extending from the orifice in the pump tube cap loosely through the drain opening and into the reservoir, whereby excess fluid is caught within the depression, and flows around the tube back into the reservoir.

COLIN BROWN.